(12) United States Patent
Stark

(10) Patent No.: US 6,927,908 B2
(45) Date of Patent: Aug. 9, 2005

(54) VISUAL DISPLAY SCREEN ARRANGEMENT

(75) Inventor: Bernard Harry Stark, London (GB)

(73) Assignee: Seamless Display Limited, Southampton (GB)

(*) Notice: Subject to any disclaimer, the term of this patent is extended or adjusted under 35 U.S.C. 154(b) by 13 days.

(21) Appl. No.: 10/432,663

(22) PCT Filed: Nov. 7, 2001

(86) PCT No.: PCT/GB01/04926

§ 371 (c)(1),
(2), (4) Date: May 23, 2003

(87) PCT Pub. No.: WO02/42838

PCT Pub. Date: May 30, 2002

(65) Prior Publication Data

US 2004/0051944 A1 Mar. 18, 2004

(30) Foreign Application Priority Data

Nov. 27, 2000 (GB) .............................................. 0028890

(51) Int. Cl.⁷ ........................ G03B 21/56; G03B 21/60; G09G 5/00; H04N 9/12
(52) U.S. Cl. ....................... 359/449; 359/454; 359/460; 345/1.3; 348/383
(58) Field of Search ................................ 359/443, 449, 359/454, 460; 353/30; 349/57; 348/383, 745, 761, 818; 345/1.3, 730, 761

(56) References Cited

U.S. PATENT DOCUMENTS

| | | | | |
|---|---|---|---|---|
| 3,768,887 A | | 10/1973 | Portmann .................... | 350/160 |
| 4,635,105 A | * | 1/1987 | Favreau ....................... | 348/383 |
| 5,056,893 A | | 10/1991 | Holz et al. .................... | 359/54 |
| 5,675,687 A | | 10/1997 | Wood .......................... | 385/115 |
| 5,828,410 A | * | 10/1998 | Drapeau ..................... | 359/450 |
| 6,327,482 B1 | * | 12/2001 | Miyashita ................... | 455/566 |
| 6,483,482 B1 | * | 11/2002 | Kim ............................ | 345/3.1 |
| 6,662,244 B1 | * | 12/2003 | Takahashi ..................... | 710/14 |

FOREIGN PATENT DOCUMENTS

| | | |
|---|---|---|
| DE | 200 09 617 | 9/2000 |
| EP | 0 139 314 | 5/1985 |
| EP | 0 179 913 | 5/1986 |
| EP | 0 559 070 | 9/1993 |
| EP | 0 680 067 A2 | 4/1995 |
| GB | 2 058 427 | 4/1981 |
| GB | 2 308 486 | 6/1997 |
| JP | 60227232 | 11/1985 |
| JP | 60 242424 | 12/1985 |
| JP | 08338972 | 12/1996 |
| JP | 09185046 | 7/1997 |
| JP | 09211487 | 8/1997 |
| WO | WO 02/42838 A1 | 5/2002 |

* cited by examiner

Primary Examiner—Christopher Mahoney
(74) Attorney, Agent, or Firm—Westman, Champlin & Kelly, P.A.

(57) ABSTRACT

A visual display screen (100') such as an LCD screen is provided with a display area (30) for displaying an image. The display area (30) extends as far as an optically inactive region (60), containing device drivers, at the edge of the screen.

A cover plate assembly (40) overlays the display area (30). The cover plate assembly is laminar and an upper translucent plastics layer (520) thereof is planar over the display area (30) but is curved at the edge to provide a lens there. Thus, the image in the display area viewed through the cover plate assembly (40) appears to be shifted to the edge of the screen (100') so that the optically inactive region (60) becomes invisible. Two screens can be abutted adjacent each other with no visible join using this technique. Compression of the image at the edge compensates for edge distortion by the lens. Repeating of the image either side of the join between two screens increases the viewing angle beyond which the join appears.

18 Claims, 14 Drawing Sheets

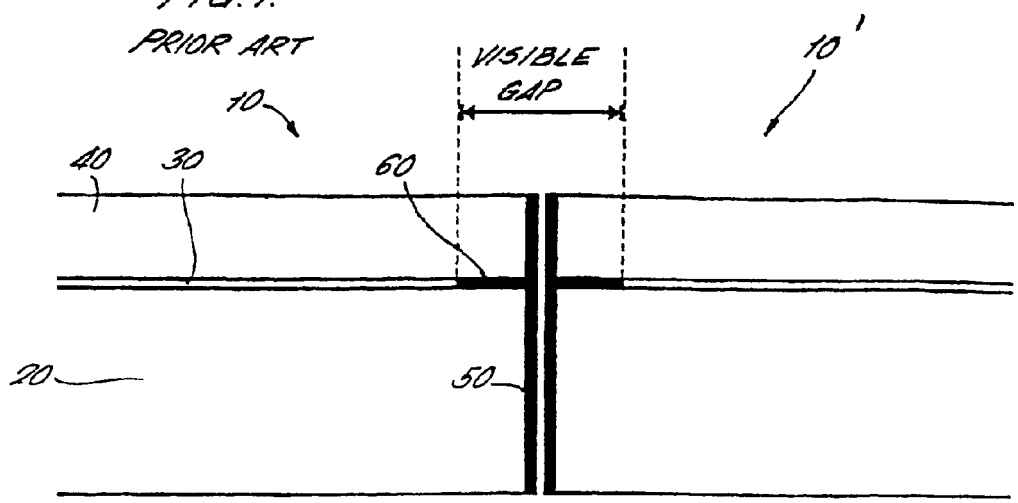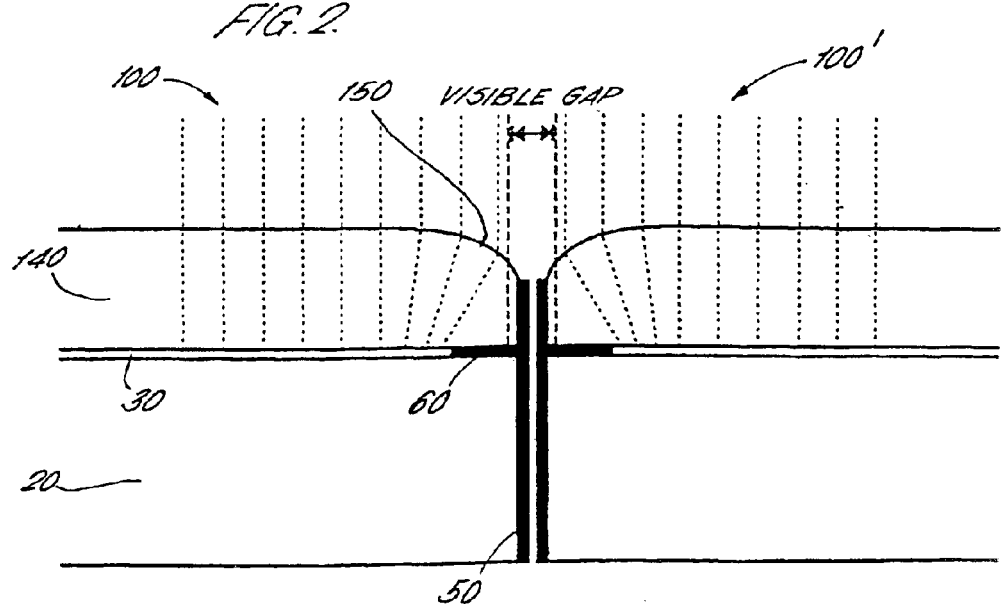

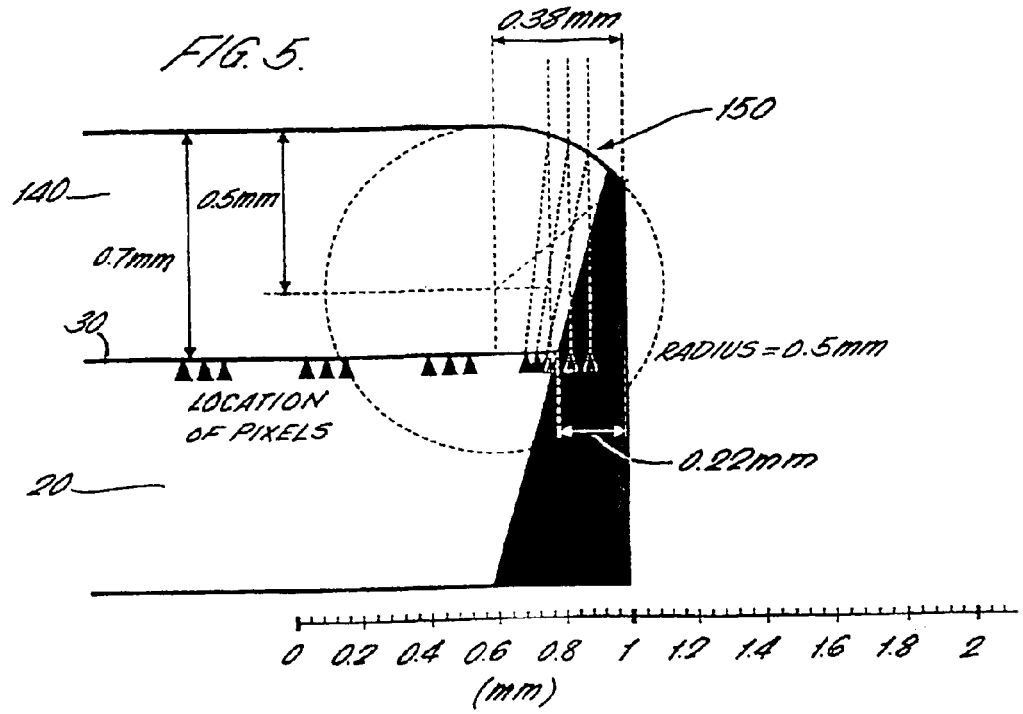
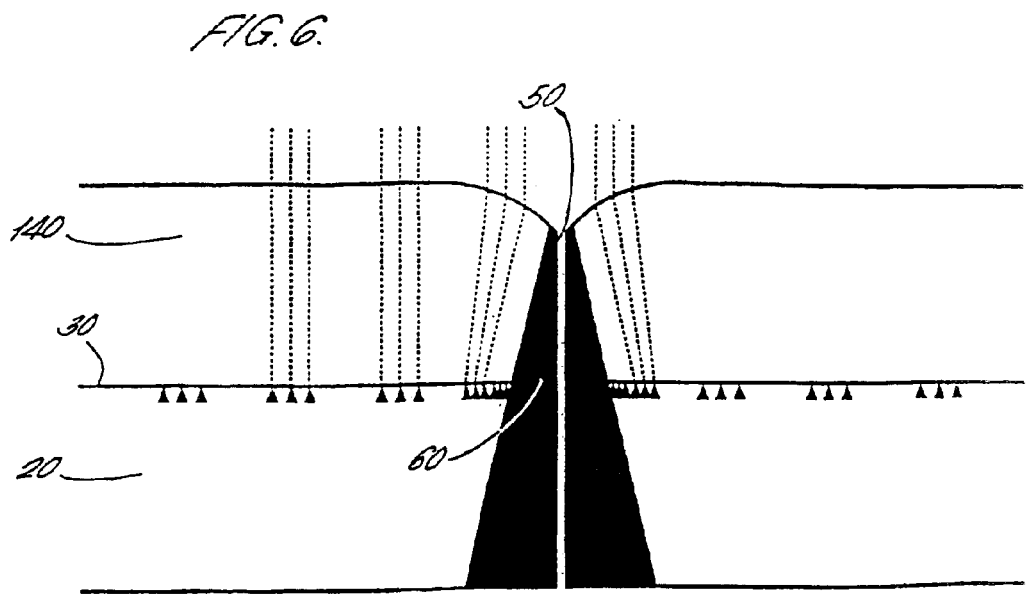

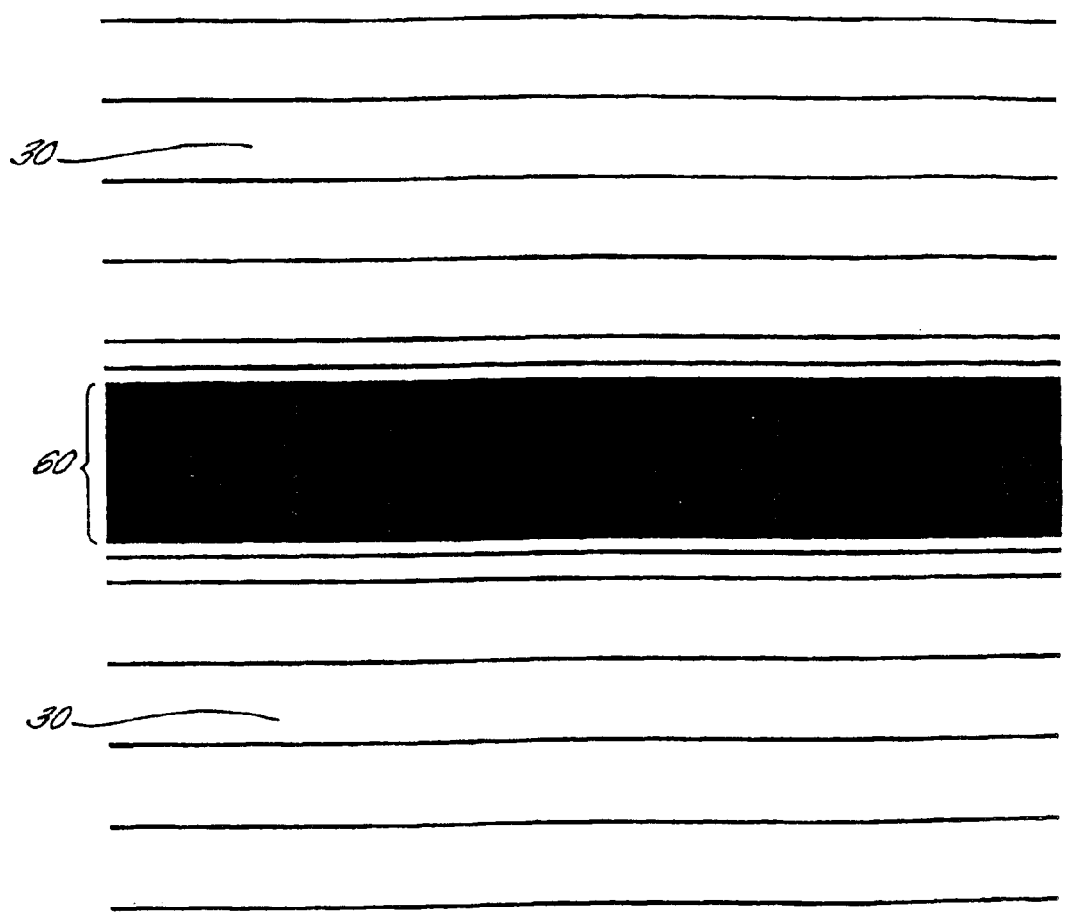

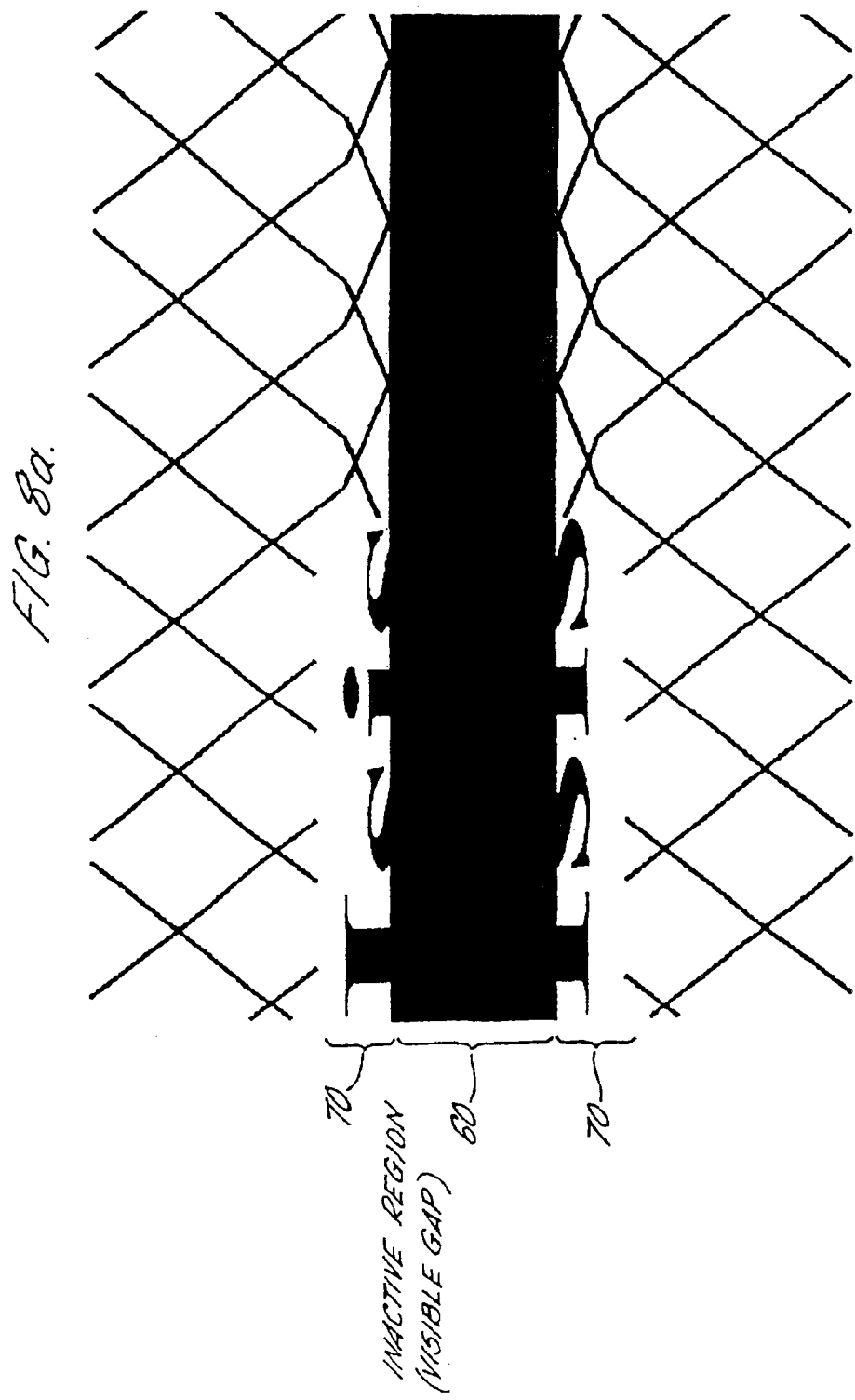

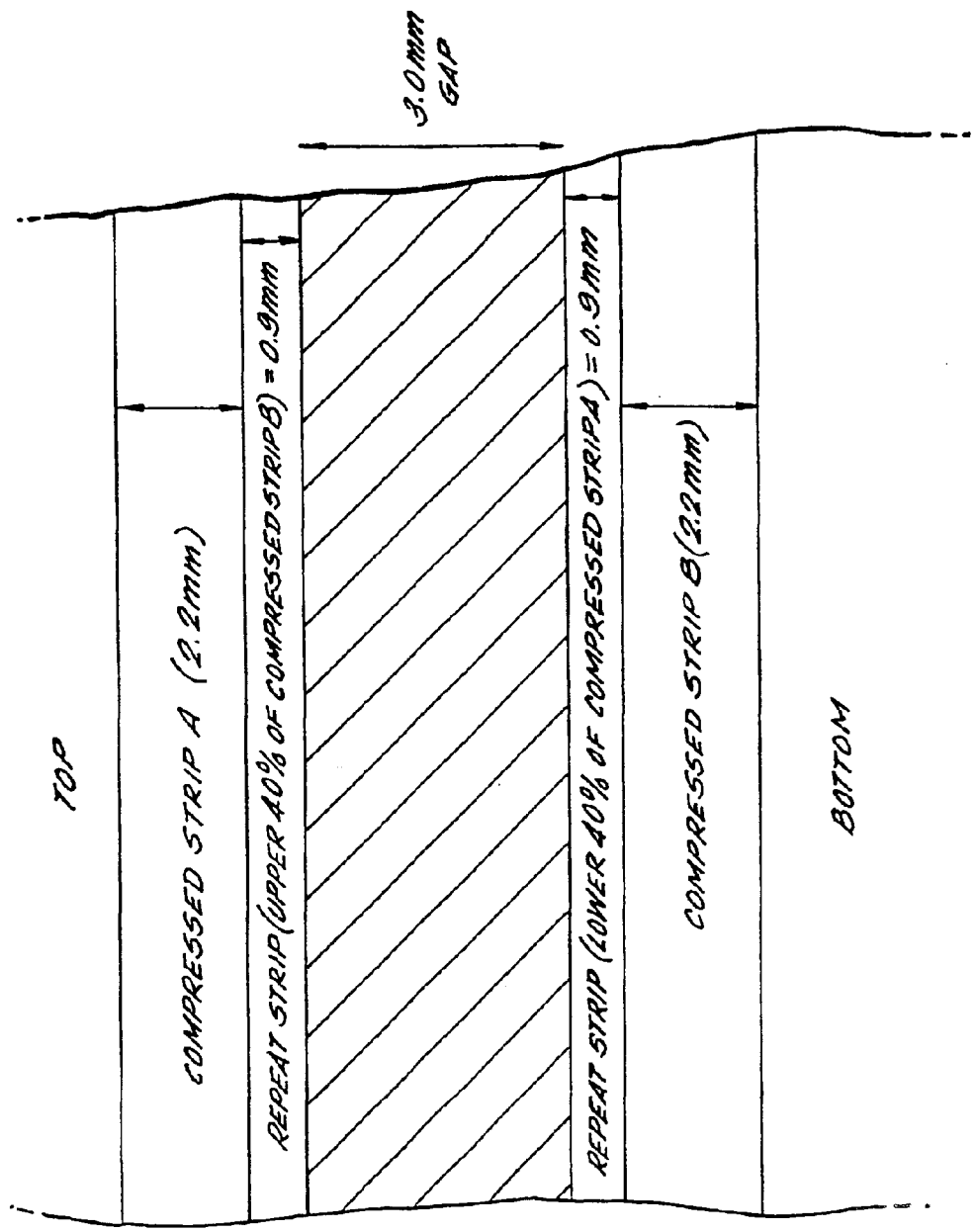

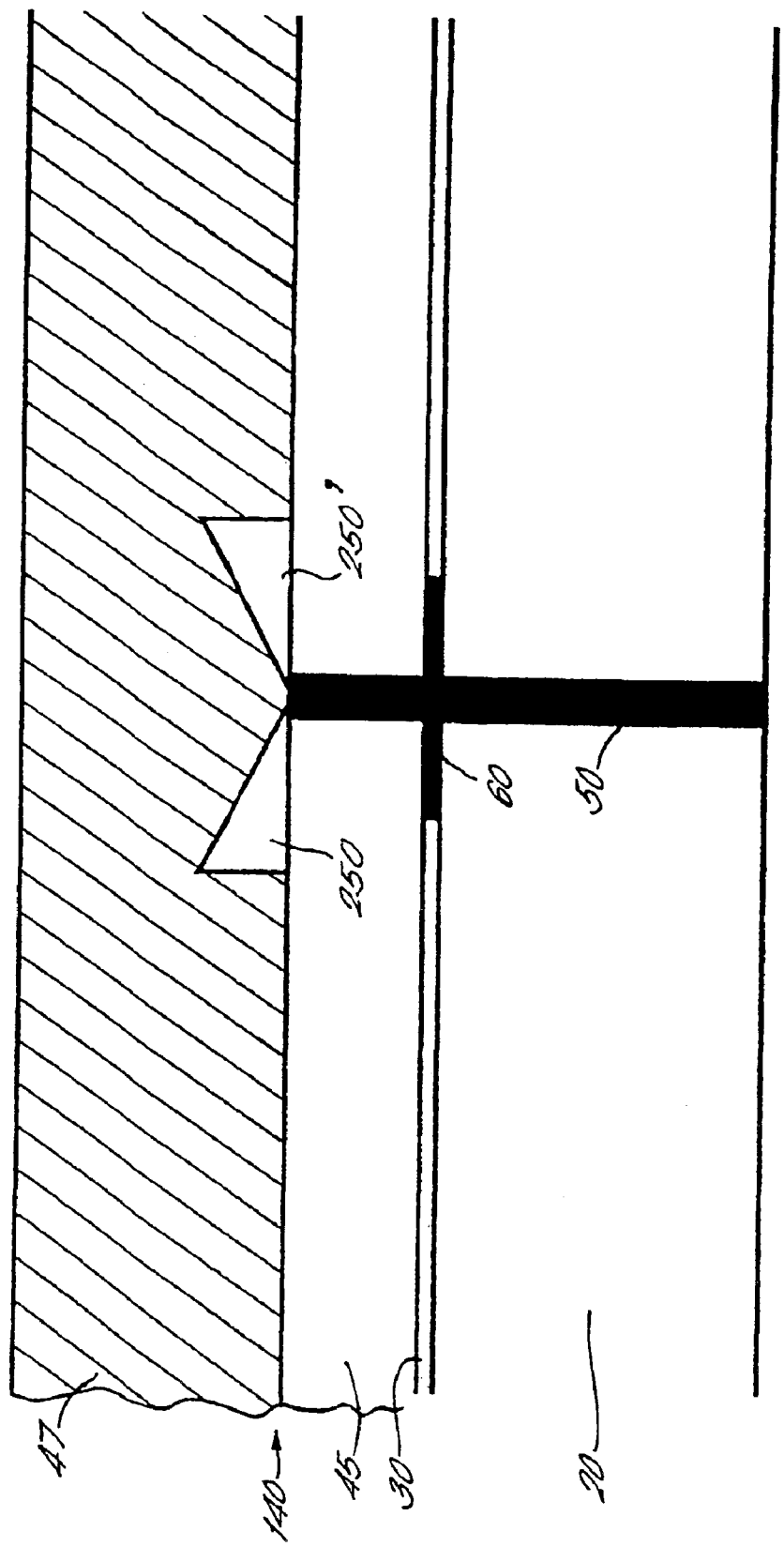

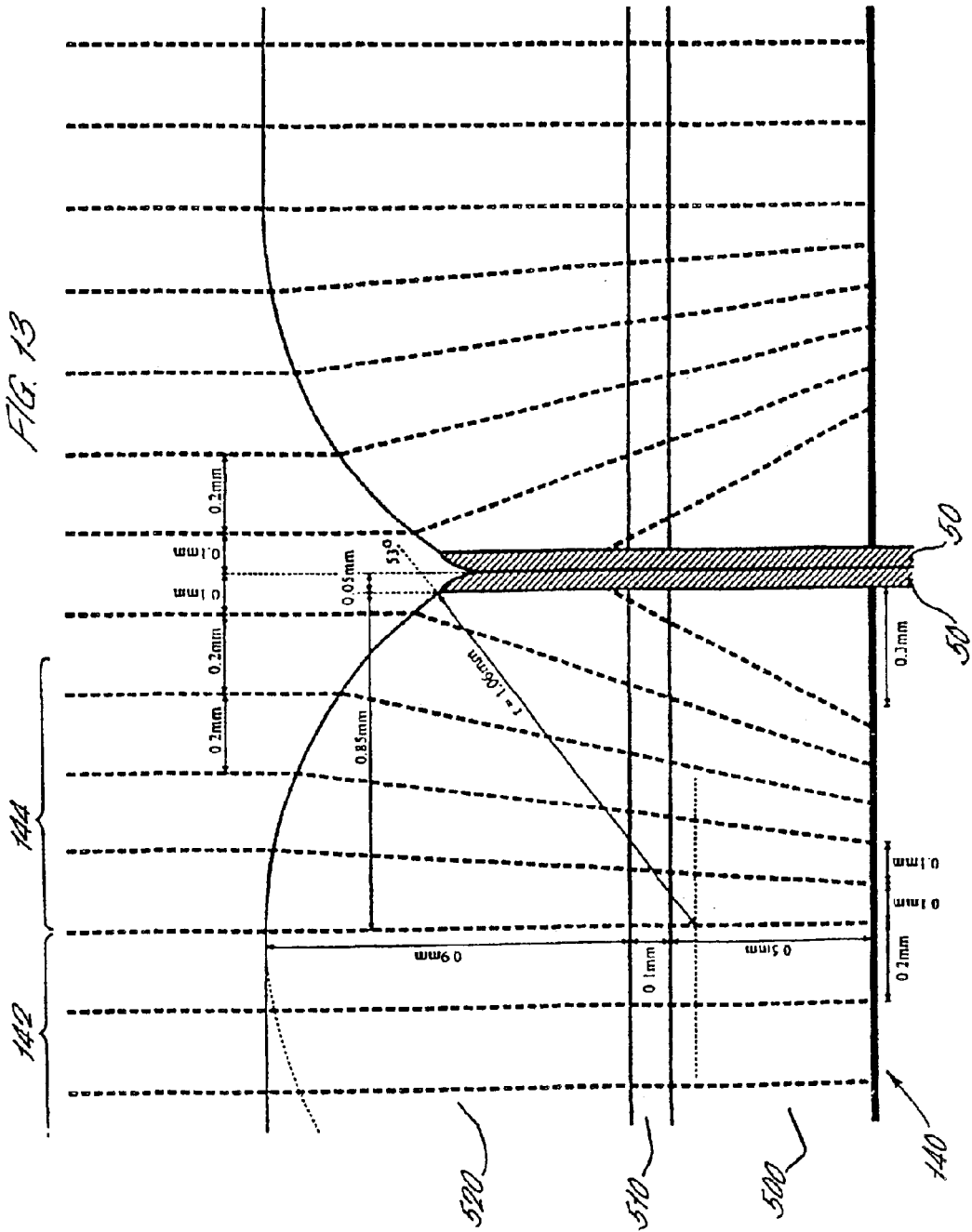

VISUAL DISPLAY SCREEN ARRANGEMENT

CROSS-REFERENCE TO RELATED APPLICATION

This Application is a Section 371 National Stage Application of International Application No. PCT/GB01/04926, filed Nov. 7, 2001 and published as WO 02/42838 on May 30, 2002.

FIELD OF THE INVENTION

This invention relates to a visual display screen arrangement.

BACKGROUND OF THE INVENTION

Many modern electrical or electronic devices contain a visual display. For example, mobile telephones, porkable and particularly palm-held digital computers each contain a (typically) backlit liquid crystal display (LCD) screen. In each case, the desire to miniaturise and thus increase the portability of such devices is balanced by the need to ensure that the screen that imparts information to the user has an adequate viewing area. In the field of mobile telephones, the emergence of technologies to view Internet pages has provided a further need to increase screen size.

Although a screen can be provided which is physically larger than the device to which it belongs, such a screen is susceptible to damage and increases the overall size of the device. Furthermore, there are practical difficulties in forming larger screens of height and width 45 cm or greater, for example.

Another problem with devices employing electrical screens in particular is that the active display area (that is, the area over which text and images is displayed, usually via an array of pixels) is by necessity smaller than the overall area of the screen. Typically, the screen has a glass cover plate and will also have an edge, which may or may not form a part of the cover plate. The edge must be of finite width, in order to protect the screen and mechanically support the glass cover plate. In LCDs, an edge is in any event necessary to contain the liquid crystals. Usually, the transistors and other electronic components necessary to drive the LCD are located adjacent the active display area as well. This means that the edge of the display is visible to a viewer of the screen.

A number of approaches have been taken to try and address the problem of the visible edge or edges of screens and LCD screens in particular. JP-A-090185046 (Casio Computer Co., Ltd.) shows a display device having two display elements with refraction plates overlaying them. A diffusion plate overlays the refraction prate. The refraction plate bends light rays from across the display elements so as apparently to close the gap between two adjacent plates so as to form a large display from two smaller ones. The problem with this arrangement is that the display device becomes heavier and more complex through the inclusion of the refraction plates.

EP-A-0,179,913 (Matsushita Electric Industrial Co., Ltd.) shows an alternative approach. Here, a light guide is employed to guide the rays from the LCD elements to he viewing surface. Since a light guide is employed for each pixel, this arrangement would be expensive to manufacture.

Finally, EP-A-0,559,070 shows an LCD panel where an attempt has been made to reduce the gap itself. The LCD panels are bent by 90° at the edges so as to bring the active area physically closer to the edge. Then, the edge seal and contacts extend downwards from the surface of the screen and do not contribute to the gap. Even then, the gap is only reduced (to perhaps 1–2 mm), and whilst this would potentially be adequate for large wall displays using adjoining screens, it would still be visible in smaller (e.g. hand holdable) screens. Moreover, the manufacture of the screens of EP-A-0,559,070 would be much more difficult than with 'standard' LCDs.

SUMMARY OF THE INVENTION

It is an object of the present invention to address these problems wish the prior art. Specifically, it is an object of the present invention to maximize the viewing area of a visual display particularly, but not exclusively, for use with a relatively small electronic device.

According to a first aspect of the present invention, there is provided a visual display screen arrangement for displaying an image, comprising: image display means having a display area; a translucent cover member arranged to cover the display area and having a first cover member edge, the display area having an edge extending towards but not as far as the said first cover member edge; characterised in that the cover member has: (a) a generally planar portion covering at least a part of the display area and being arranged to pass rays of light substantially without bending such that the majority of the display area as viewed externally of the arrangement and through the said generally planar portion, appears substantially undistorted; and (b) a refracting portion which includes the said first cover member edge, the said refracting portion being arranged to bend only those rays of light emanating from at or adjacent to the edge of the display area, such that the said display area as viewed externally of the arrangement and through the said refracting portion, appears to extend substantially as far as the edge of the cover member.

With devices containing known display screens such as liquid crystal displays or cathode ray tubes, the active viewing area is by definition smaller than the width of the device itself. In the case of liquid crystal displays, this is because edge seals are necessary to contain the liquid crystals between the cover member and the body. Side walls are also often employed to increase mechanical protection. In the case of cathode ray tubes, again side walls are necessary because the tube itself must be evacuated, and also because the range of sweep of an electron beam across the tube (in order to form an image) must be less than the width of the tube itself. Thus, when two or more such known displays are placed adjacent to one another, a visible gap occurs. With liquid crystal displays, this visible gap is (with commercially available technology) approximately 3 mm wide. Such a gap is unacceptable, particularly for mobile telephone screens, for example, which may only be one order of magnitude larger than this.

The present invention overcomes these problems. By causing only light at the edge of the arrangement to be bent, whilst allowing transmission through the translucent cover member away from the edge without any significant- bending or distortion, the gap can be effectively made to disappear without requiring separate lenses or complex modifications to the arrangement.

Such a technique is-particularly advantageous where the screen arrangement comprises two panels abutting one another. Here, the join between the two panels can be made apparently almost to disappear if the light is bent by each panel where it abuts the other, but only at that location.

In a particularly preferred embodiment, the visual display screen arrangement is further arranged to generate a part of an image both within the first display area and adjacent the first cover member edge, and also within the second display area and adjacent the edge of the second cover member.

This technique reduces the visibility of the gap when the observer moves out of perfect alignment with the screen arrangement (for example, by viewing the arrangement at an angle to the plane of the panels)

It is preferable that the image, when displayed in the display are, is compressed adjacent to the respective panel edge. There are several ways of doing this. In one preferred embodiment, the or each display area has a resolution and, specifically, a pixel resolution adjacent the respective panel edge which is higher than the pixel resolution of the or each display area away from the respective panel edge. Alternatively, the image itself may be compressed electronically without then needing to compress to pixels adjacent the respective panel edge. Compression is useful to allow compensation for the distorting effect of light ray bending, through a lens arrangement, for example.

Preferably, the generally planar portion of the or each cover member is coterminous with that part of the display area having the relatively lower resolution, and wherein the or each refracting portion is coterminous with that part of the display area adjacent to the respective cover member edge having the said relatively higher resolution. In other words, the non-distorting part of the cover member overlays the relatively low resolution pixels, whereas the light bending part of the cover member overlays the relatively high resolution pixels.

In the preferred embodiment, the refracting portion of the or each cover member is formed with the cover member edge shaped so as to form a lens, such as a convex lens, to bend the light passing therethrough. Other techniques for bending the light, such as coating the panel edge with a high refractive index material, or incorporation of other materials, may also be used.

In preference, the cover member is formed as a laminar construction with, for example, a lower layer adjacent to the display area and formed of a first material, an upper layer formed of a second, different material, and a polarisation/compensation layer sandwiched between the upper and lower layers. In that case, the lower layer may be formed of glass and the upper layer of a plastics material. This allows a very simple construction for the arrangement. A 'standard' LCD can be made without any changes to the glass layer. A plastics layer can then be laminated on top, and its edge bevelled for example to provide the light bending at that edge. Then the glass layer (which may contain delicate structures) need not be machined.

Not withstanding such preferred features, it is to be understood that, by cover member is meant any physical structure, or part of a physical structure, which covers, surrounds or even provides a part of the display area of the image display means, such as the body or screen of a CRT, or the translucent panel and/or edge seal and/or other body parts of an electronic display such as an LCD. In particular, the cover member may contain active elements of the display.

According to a further aspect of the present invention, the e is provided a visual display screen arrangement for an electronic device comprising a first screen member having a first active display area and a first joining edge, and a second screen member having a second active display area and a second joining edge;

the first and second screen members being movable between a first position and a second position, in which second position the first and second joining edges are adjacent, the first and second screen members are generally coplanar, and the first active display area appears to a user substantially to abut the second active display area at the confluence of the first and second joining edges.

The arrangement of the present invention permits one large visual display area to be provided through the collocation of two or more smaller screen members. The active display areas of two or more screen members meet, or at least appear to meet, at a joining edge between the two or more screen members and, in the preferred embodiment, an electronic device, with which the visual display screen arrangement communicates, addresses the two or more screen members separately so that a single image (for example), scanning both or each screen member, may be displayed.

In the preferred embodiment, the arrangement further comprises hinge means connecting the first and second screen members and constraining the first screen member and second screen member to be foldable between the first and second positions.

Such an arrangement is particularly advantageous for small, hand-held devices such as mobile telephones, video cameras or so-called "palm top" computers. When not in use, the overall height and width of a device having the arrangement of the invention need be no larger than previously. By unfolding the screen arrangement, however, a composite screen which is much larger than the electronic device with which it communicates may be provided. The advantages of a mobile telephone with a composite screen which is, for example, 15–20 cm wide (rather than the standard width of 3–5 cm) are manifest, particularly for telephones with Internet access.

Preferably, the screen members are each liquid crystal displays. The first and second screen members may each include a screen member body having a cover piece. Alternatively, a single cover piece may be shared by both screen members. Each cover piece or, alternatively, each screen member body then preferably forms a lens along the said first and second joining edges respectively and is arranged to shift the apparent location of the edge of the first and second active display areas so that they appear to a user substantially to abut one another. With this arrangement, even where the active display areas do not extend right to the edge of the screen member (as will be the case with liquid crystal displays, for example), the lens arrangement bends light passing through the joining edges so that, as viewed from above the screen arrangement, the plurality of separate active display areas appears to a user as a pseudo-continuous, single active display area.

In accordance with a third aspect of the present invention, there is provided a visual display screen arrangement for displaying an image, comprising a panel and including a light bending region therein; and image display means having a display area located beneath the panel, the display area extending across a major portion of the panel area but comprising at least one inactive zone in the display area, the or each inactive zone being located substantially underneath the said light bending region in the panel; wherein the light bending region is arranged to bend rays of light passing therethrough, such that an image formed within the display area and viewed through the panel appears to extend across the inactive zone substantially without discontinuity.

BRIEF DESCRIPTION OF THE DRAWINGS

The invention may be put into practice in a number of ways, and some of these will now be described by way of example only and with reference to the following Figures in which:

FIG. 1 is a highly schematic sectional view through the edge of two prior art liquid crystal display (LCD) panels when placed adjacent one another;

FIG. 2 shows a highly schematic sectional view through the edge of two LCD panels, each having a display area and lens, placed adjacent one another, and embodying one aspect of the present invention;

FIG. 5 shows suitable dimensions for the panel arrangement of FIG. 3, based on calculations using Snell's law;

FIG. 6 shows the location of the LCD pixels in the view of FIG. 2 including repeat pixels;

FIG. 7 shows a schematic plan view of the pixel arrangement in the apparatus of FIG. 2, indicating how the pixel spacing decreases towards the edge of the arrangement without the repeat pixels of FIG. 6;

FIG. 8a shows images formed in the display areas of each of the two LCDs of FIG. 2, without the lenses;

FIG. 8b shows suitable dimensions for a large scale model of the image of FIG. 8a but with repeated strips;

FIG. 12 shows a visual display screen arrangement embodying a further aspect of the present invention;

FIG. 13 shows a further embodiment of a visual display screen arrangement in accordance with the present invention; and FIGS. 14a, 14b, 14c and 4d show applications for the visual display screen arrangements of FIGS. 2 to 13.

DETAILED DESCRIPTION OF THE PREFERRED EMBODIMENTS

Figure 3:
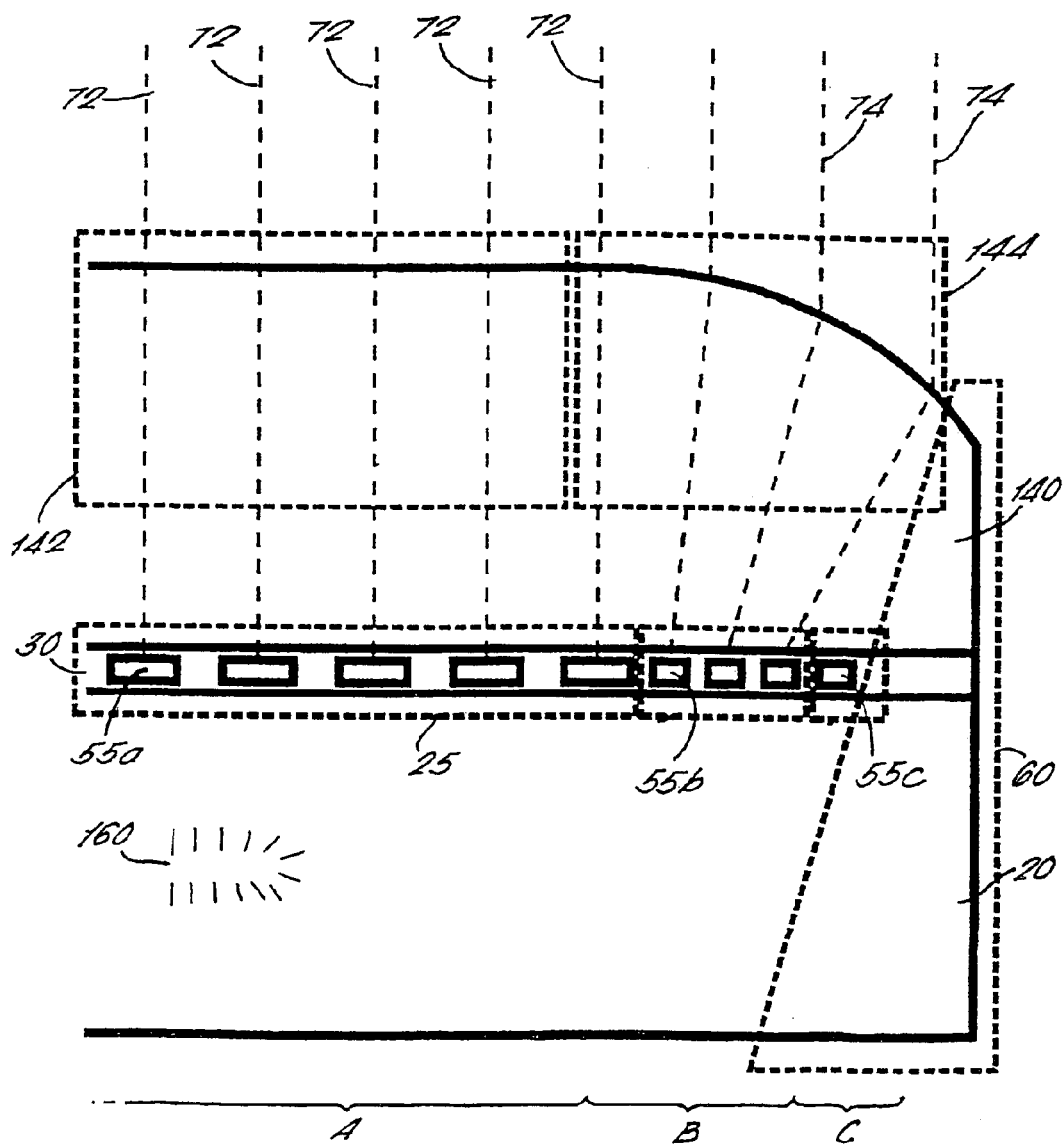
FIG. 3 shows a sectional view through the edge of one of the LCD panels of FIG. 2, in more detail.

Referring first to FIG. 1, a highly schematic sectional view through the edge of two prior art liquid crystal display panels 10, 10' is shown, roughly to scale. Each LCD panel comprises a supporting substrate 20 (typically including a reflector, first glass plate, first polarizing element and backlight where appropriate) onto which is mounted a glass cover plate 40. Sandwiched between the supporting substrate 20 and the glass cover plate 40 is a volume which forms an active display region 30. The active display region 30 contains a plurality of electrodes, as will be familiar to those skilled in the art, together with liquid crystals.

The panels 10, 10' may be bounded by side walls 50 which provide mechanical protection to the panel. The liquid crystals are contained within the active display region 30 also by an epoxy edge seal which typically has a protective layer thereon. In consequence of this, there is a region adjacent to the edge of the LCD panel which cannot be used. This optically inactive area 60 is, in present LCD panels, typically between 1 and 1.5 mm wide.

Because of the optically inactive area 60, even if the protective side walls 50 of two LCD panels 10, 10' abut one another, a minimum total inactive region of around 3 mm in width is then present.

Thus, when placing two LCD panels adjacent to one another, a visible gap is clearly discernable between the two active display regions. A significant "seam" is unacceptable and prior art arrangements are accordingly unsuitable for creating larger screens from an array of smaller screens placed together.

FIG. 2 shows a highly schematic sectional view through-the edge of two LCD panels 100, 100' embodying the present invention. Features common to FIGS. 1 and 2 are labelled with like reference numerals.

In the arrangement of FIG. 2, instead of the flat, generally planar cover plate assembly 40 of FIG. 1, the cover plate assembly 140 is instead curved at its edge, where it joins the protective side wall 50. The curved edge 150 acts as a lens and refracts light as may be seen by the dotted lines in FIG. 2. This in turn has the effect of reducing the apparent width of the visible gap. The radiused edge 150 is also less susceptible to damage.

FIGS. 3 and 5 show the edge geometry in more detail. Again, features common to FIGS. 1, 2, 3 and 5 are labelled with like reference numerals. As seen in FIG. 3, the cover plate assembly 140 can be notionally divided into two separate regions, a generally planar region 142 and a refracting region 144 which is convex in the example of FIG. 3. The cover plate assembly 140 overlays a main display area 25 having a display region 30 which may be Liquid Crystal, Polymer, Bi-stable (I-ink™ or the like. Within the display region is a plurality of pixels 55a, 55b, 55c, whose arrangement will be described in more detail below. Light from the pixels 55a, arranged away from the optically inactive area 60, which includes the edge seal and edge protection, is substantially unaltered in direction by passage through the planar region 142 of the cover-plate assembly 140. This is shown in FIG. 3 by the rays 72. By contrast, light from pixels 55b, for example, which are closer to the optically inactive area 60, is bent by the refracting region 144 of the cover plate assembly 140, as seen in rays 74.

FIG. 3 also shows the supporting substrate 20 which may, for example, be a sandwich of materials and elements necessary for display, such as a backlight 160, and in the same manner the cover plate assembly 140 can be a sandwich of materials containing elements necessary for the display.

The method of shaping the edge into a radius results in an image that appears at the edge. In order to compensate for the dimensional distortion resulting from the curved surface 150, the pixels are compressed in regions B and C of the main display area 25 adjacent the optically inactive area 60. Depending upon the shape of the refracting region 144, the pixel resolution may be gradually increased or abruptly increased.

Figure 10A:
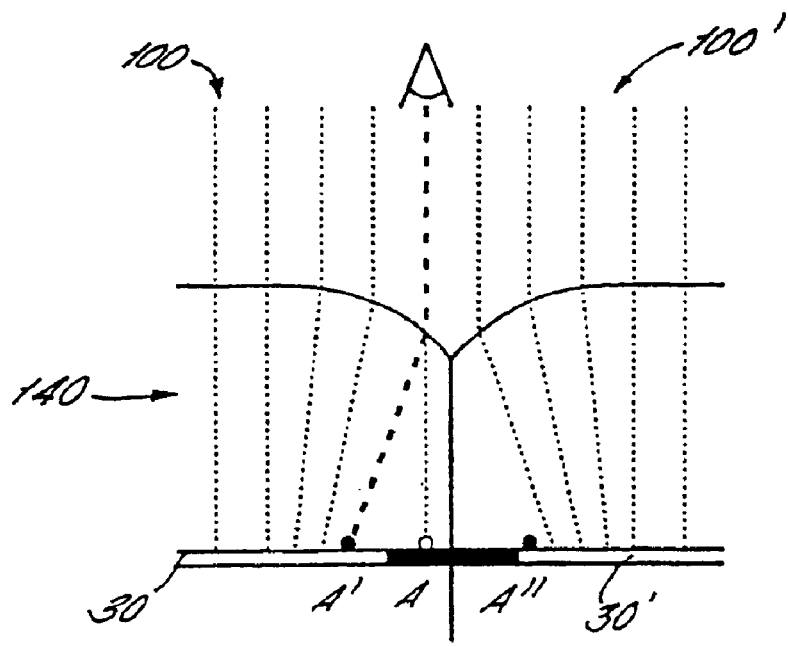
FIGS. 10a and 10b show ray diagrams for the panel arrangement of FIG. 2, when viewed perpendicular to the plane of the panel and at an angle thereto respectively.

Region C is an image repetition zone. This is provided immediately adjacent to the inactive region area 60. The purpose of this will be described in connection with FIGS. 10a and 10b below. The remainder of the main display area, A, contains the relatively lower resolution pixels 55a. It is to be understood that, in the preferred embodiment, the pixel spacing of the pixels 55a may be the same as the spacing in a 'normal' LCD panel, with the pixels 55b, 55c being more closely packed. For ease of manufacture, however, it is instead possible to use a display area 25 in which each separate pixel is equally spaced, and either to electronically compress the image, or, for example, to address two adjacent pixels in the region A in tandem, whilst addressing each separate pixel in the regions B and C separately. In the latter arrangement, each pair of pixels in the region A acts as a single, larger pixel.

Using Snell's law, the geometry of the radiused edge 150 can be estimated. FIG. 5 shows the geometry in a "worst case" scenario, with glass, having a low refractive index, provided as part of the cover plate assembly 140. It is stressed here that the dimensions provided are by way of example only and that the dimensions are widely variable dependent upon the application and materials. It will be appreciated that the higher the refractive index, the thinner the cover plate assembly needs to be for a given width of optically inactive area 60. Using 0.7 mm thick glass (typical for LCDs), having a nominal refractive index of 1.5, and with the radiused edge 150 having a radius of 0.5 mm, the lateral distance over which the cover plate assembly 140 must be curved is 0.38 mm. The edge and seal width at the height of the liquid crystal is over 220 $\mu$m, as opposed to 80 $\mu$m without edge shaping. For a screen resolution of 75 dots per inch (30 dots per cm), only the pixels immediately adjacent to the optically inactive area 60 need to be of closer line spacing.

Figure 4:
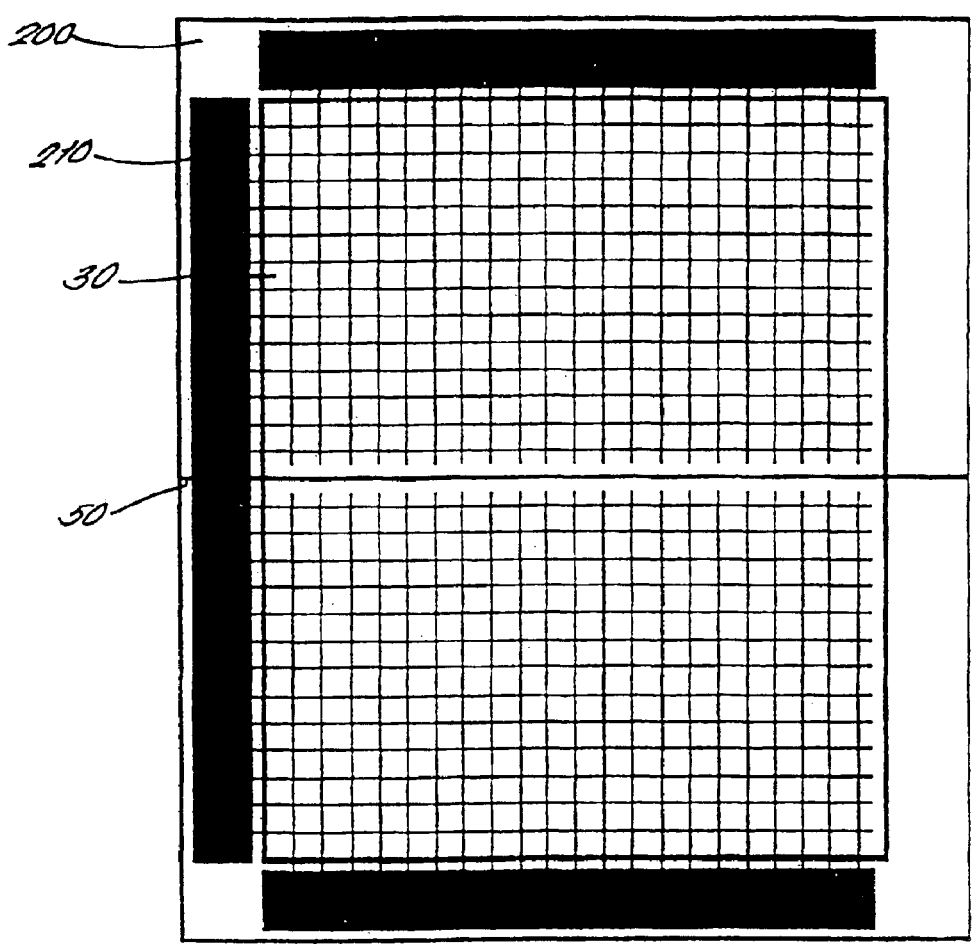
FIG. 4 shows, in schematic plan view, the electronics employed to drive the two LCD panels of FIG. 2.

FIG. 4 shows, in schematic plan view, the electronics employed to drive the two LCD panels of FIG. 2. Each panel is formed on a frame 200. Driver circuitry for addressing the transistors within the display is provided on two sides of the screen only, rather than also at the join defined by the protective side walls 50 of the two panels. It will, of course, be understood that the driver circuits could instead be located beneath the display.

FIG. 6 shows a further sectional view of the arrangement of pixels within the active display region and it will again be noted that the pixel resolution increases with proximity to the optically inactive area 60. The arrangement of FIG. 6 also includes so-called repeat pixels whose purpose will be explained further in connection with FIGS. 10a and 10b. FIG. 7 shows, by contrast, a schematic plan view of the pixel arrangement in the arrangement embodying the invention, with horizontal lines representing the rows of pixels. In FIG. 7, the repeat pixels of FIG. 6 are not shown.

Figure 9:
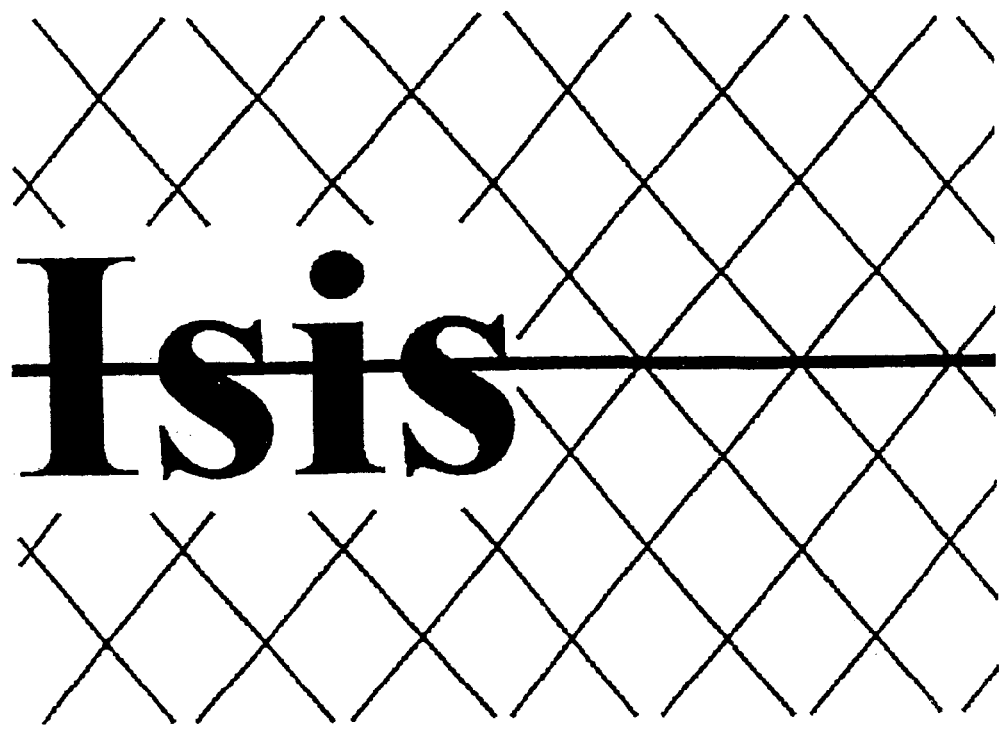
FIG. 9 shows images formed in the display areas of each of the two LCDs of FIG. 2 with the lenses, and as viewed from above.

FIGS. 8a and 9 show an exemplary image formed in the active display regions of each of the two LCDs of FIG. 2, without and then with the lenses in place respectively. It will be noted from a comparison of FIG. 8a and 9 that the image in the active display region is compressed as it approaches the inactive region, and that the lens compensates for the visible gap and the compressed image such that the gap substantially disappears and the image as actually seen by a user is undistorted.

To verify the technique, an image such as is shown in FIG. 8a was generated and printed onto white paper. Two perspex blocks, each having a bevelled edge, were placed together so that the bevelled edges abutted. The printed paper was backlit through a light box and the visible gap shown in FIG. 8a reduced to the thin, almost invisible line of FIG. 9.

The dimensions used were as follows: thickness of perspex blocks=9.2 mm; radius of curvature of edge=4.6 mm, subtending an arc of 50°; refractive index of perspex=1.43. The image was formed with a 3.0 mm black gap surrounded by 0.9 mm repeat strips (as explained below in connection with FIGS. 10a and 10b) and 2.2 mm compressed strips. This schematic image structure is shown in FIG. 8b.

Figure 10B:
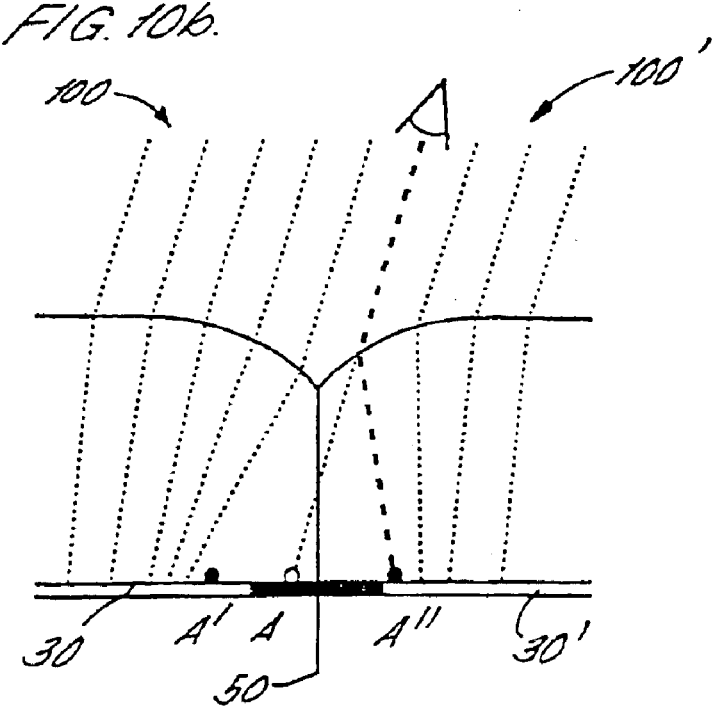

The foregoing description has discussed refraction of light rays incident generally perpendicular to the planar part of the cover plate assembly 140, that is, when the screen is viewed face on. When an observer moves out of perfect alignment to the screen, by contrast, the gap becomes more visible if certain precautions are not taken. This may be explained with reference to FIGS. 10a and 10b, which show a ray diagram for the cover plate assembly 140 of the panel arrangement of FIG. 2 when viewed perpendicular to the plane of the panel and, separately, at an angle thereto respectively. Consider first the virtual point A in FIG. 10a. When viewed directly from above, this virtual point is actually being displayed by a pixel at the location A' within the active display region 30. When the observer moves to the right, however, as shown in FIG. 10b, the virtual point a then falls behind the join defined by the protective side walls 50 of each of the two LCD panels 100, 100'. In order to overcome this, part of the image displayed in the active display region 30 of the LCD panel 100 is repeated in the active display region 30' of the other LCD panel 100'. The virtual point A in FIG. 10b is now displayed by the pixel at location A" in the right-hand LCD panel 100' instead. In other words, in the active display region 30' of the right-hand LCD panel 100', the edge is projecting a section of what is normally seen from the active display regain 30 of the left-hand LCD panel 100.

By repeating the image on either side of the join where the protective side walls 50 of the LCD panels 100, 100' abut, the observer's eye does not register the join even when viewing the screen away from the perpendicular. Using such an arrangement, the angle of viewing of the screen before the join becomes visible can be increased from about 8° about an axis perpendicular to the display region 30, up to about 20° either side of that axis. The amount of repetition is variable. For example, the test arrangement of FIG. 8b employs a 40% repetition, that is, the upper 40% of the image in the lower compressed strip B is repeated in he upper repeat strip and vice versa. Increasing the percentage gives better viewing angles but results in a narrower gap.

Figure 11A:
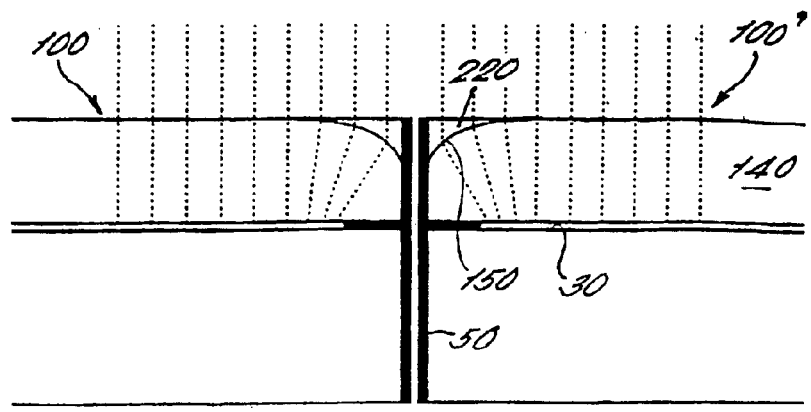
FIGS. 11a, 11b and 11c show alternative embodiments of one aspect of the present invention.
Figure 11B:
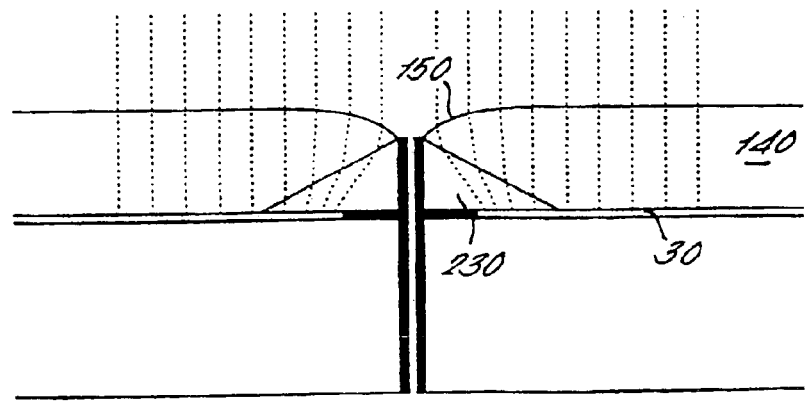
Figure 11C:
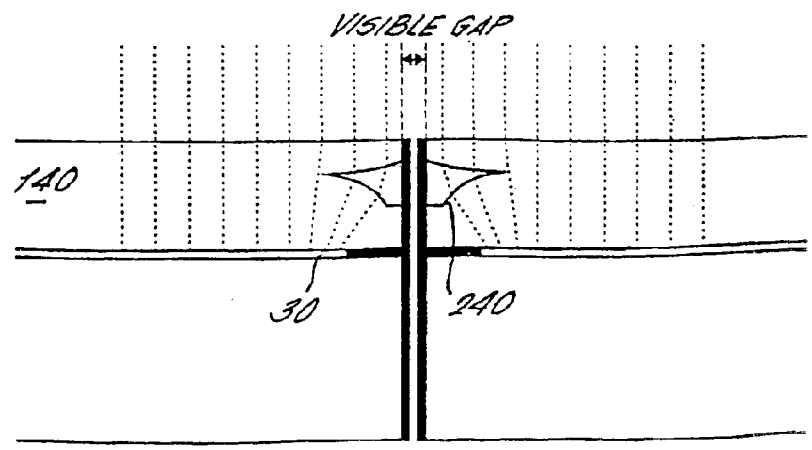

Referring now to FIGS. 11a to 11c, different arrangements for refracting the light around the inactive region of the LCD are shown. In the arrangement of FIG. 11a, two materials are employed, with a low refractive index material 220 formed over the radiused edge 150. As previously explained, the higher the refractive index, the thinner the lens needs to be for a given width of inactive region.

To achieve a higher degree of refraction, two interfaces may be used as well or instead. For example, a region of low index of refraction material 230 may be employed adjacent to the supporting side wall, as shown in FIG. 11b. In FIG. 11c, an undercut edge may be provided to deflect the rays. The particular choice of shape will depend upon the maximum degree of reflection deemed permissible, amongst other considerations. The region defined by the undercut edge of the cover plate assembly 140 may, for example, be filled with material such as a resin. In yet an alternative arrangement, the material could be situated directly on the active display, in an analogous manner to that shown in FIG. 11b. In general, to minimize the thickness of the cover plate assembly 140, it is desirable that the translucent part be formed of a material such as a relatively heavy flint glass having a refractive index in excess of 1.6. Other materials such as perspex or a lightweight glass coated plastics material could be employed instead, to save costs, but, having a lower refractive index, would need to be relatively thicker.

FIG. 12 shows a sectional view through an LCD screen arrangement embodying a further aspect of the invention. The arrangement of FIG. 12 includes two separate panels having separate supporting substrates 20, two active display regions 30 containing liquid crystals or CRT pixels and separated by an inactive area 60 and protective side walls 50, and a cover plate assembly 140 formed of separate panel covers 45 but with a single screen cover 47 covering both panels. In contrast to the embodiments of FIGS. 2–11, the arrangement is not intended to be foldable which is why a single screen cover 47 is instead provided to span both of the active display regions 30. Two wedge shaped recesses 250, 250' are cut in the base of the screen cover 47 to act as lenses either side of the join formed by the protective side walls 50. As with other embodiments, it is preferable that the part of the image formed at the edge of one of the active display regions, adjacent the inactive area 60, is repeated on the other side of the join, again in the region immediately adjacent to the inactive area 60. As with previous embodiments, the pixel spacing is reducing adjacent the inactive area 60.

Even though the arrangement of FIG. 12 is not foldable, it is still advantageous in that it allows a large composite screen to be formed from an array of smaller screens, with an essentially invisible seam or seams. This is particularly advantageous for LCD, where there are difficulties in manufacturing single, large area displays.

Turning now to FIG. 13, still a further embodiment of a visual display screen arrangement is shown. For ease of explanation, only the cover plate assembly 140 notionally divided into a generally planar portion 142 and a refracting portion 144) is shown. It will be understood that a main display area and supporting substrate are typically located below the cover plate assembly 140, however.

In contrast to the embodiment of, say, FIG. 5, the cover plate assembly 140 is Preferably made up of a stack of layers. A lower layer 500, adjacent to the (not shown) main display area, is typically formed of glass. On top of that is a thin sandwich layer 510 of polarisation/compensation material. Finally, an upper layer 520 of a tough plastics material is laid down on top of the thin sandwich layer 510.

The glass lower layer 500 and the polarisation/compensation material of the thin sandwich layer 510 are, as may be seen, of 'standard' shape without any means to cause light to bend. Instead, it is the plastic upper layer 520 which contains the curved edge that causes light refraction.

There are a number of benefits to this arrangement. Firstly, the overall weight of the cover plate assembly 140, and thus the visual display screen as a whole, is reduced relative to a solid glass cover plate assembly. This is particularly desirable in lightweight devices such as PDAs or mobile telephones where a few grammes can be important. Secondly, the laminar construction of FIG. 13 allows any shaping at the edge of the cover plate assembly to take place on the plastic upper layer 520, well away from any sensitive components in or near the glass lower layer 500. Finally, it reduces still further manufacturing complexity relative to the prior art. The top of traditional LCDs already comprises a lamination of glass and polarisation/compensation material forming a panel approximately 0.6 mm thick. Thus, a perspex sheet may simply be laid down on top of this, either before or after edge shaping, to achieve the composite cover member of FIG. 13.

It is to be understood, of course, that a single glass sheet providing the cover plate assembly also has its advantages, particularly in terms of refractive index which makes the amount of curvature required less.

Suitable dimensions for a device are set on FIG. 13 itself. These values are for guidance only and it will also be appreciated that the geometrical arrangement provides for direct scaling of the values given.

Figure 14A:
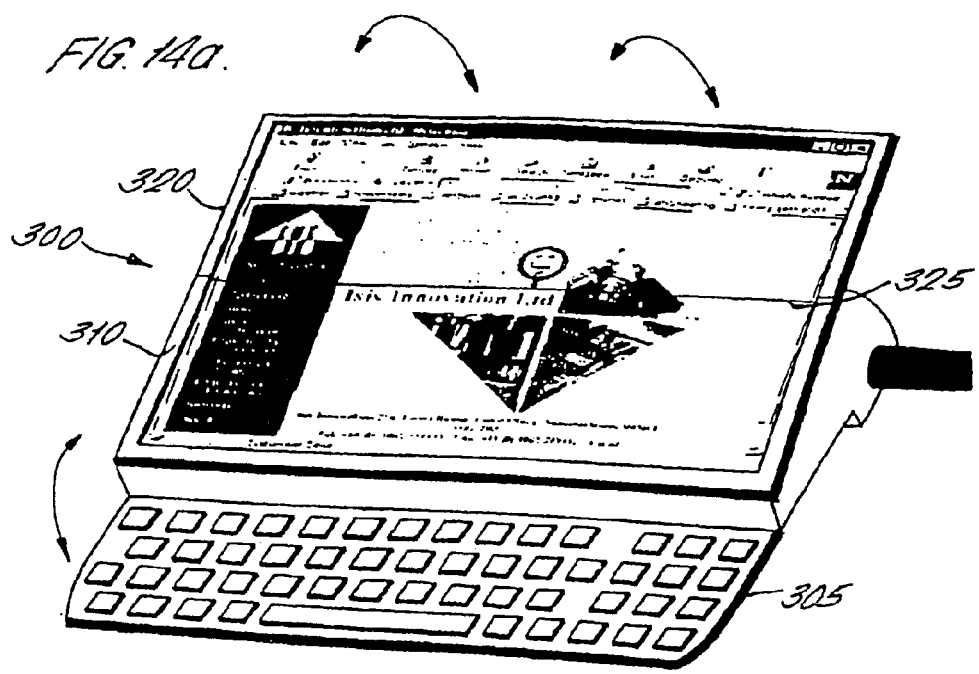

Turning finally to FIGS. 14a–14d, some exemplary applications for the arrangements of FIGS. 2–13 are shown. FIG. 14a shows a first mobile telephone 300 having a body part 305 with a keyboard, and a screen formed from two LCD screen parts 310 and 320, each of which is generally of similar dimensions to the keyboard. The screen parts are foldable relative to one another by means of a hinge (not shown) such that, in a first, closed, position, the cover plate assembly of one contacts that of the other. This protects the screen parts 310, 320 when not in use. In a second, open position as shown in FIG. 14a, the two screen parts are folded away from one another. By addressing each screen part 310, 320 differently (which technique will be familiar to those skilled in the art), a composite image as seen in the Figure can then be forced and this extends across the join 325 to fill the whole screen.

Figure 14B:
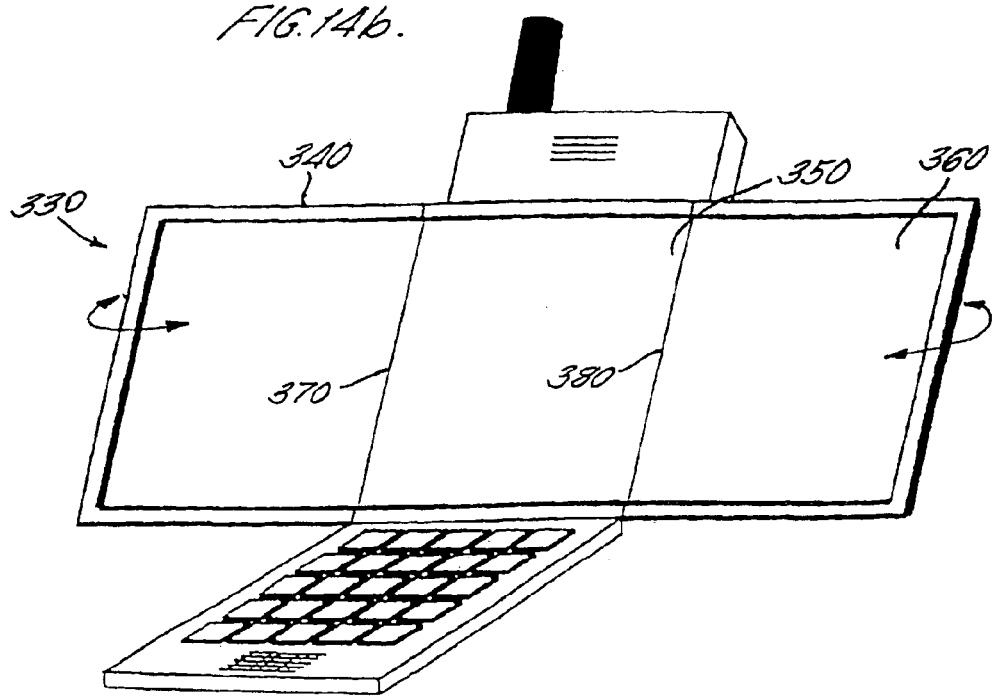

FIG. 14b shows a second mobile telephone 330 with a foldable screen containing three screen parts 340, 350, 360. The central screen part 350 is mounted in fixed relation to the body of the mobile telephone, and the left and right-hand parts 340, 360 are foldable relative thereto. Thus, in a first position, the left-hand screen part 340 folds against the central screen part 350 such that the cover plate assemblies thereof face one another. After that, the right-hand screen part 360 is folded over the back of the left-hand screen part 340 so that the cover plate assembly of the right-hand screen part 360 faces the supporting substrate 2C of the left-hand screen part 340. When opened, the composite screen has three parts with two joins 370, 380. The principle of a three-part screen arrangement is exactly the same as has been described with the one and two-part screen arrangements of FIGS. 2 to 13. Obviously, the central screen part 350 requires shaped edges on both sides. In that case, i. may be desirable to have the driver circuits to address the central screen part 350 underneath the supporting substrate, but this is not a problem since the central screen part 350 is mounted upon the body of the telephone.

Figure 14C:
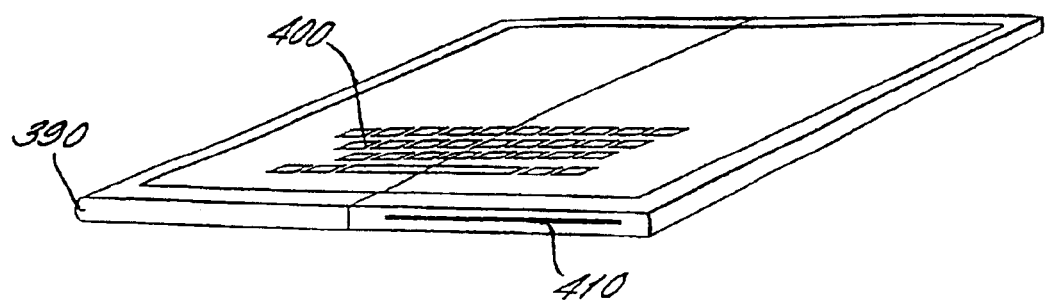

FIG. 14c shows a foldable touch screen device 390 which has a touch screen keyboard 400. This device is capable of lying flat upon a table when unfolded and is thus less intrusive than a laptop computer. The device 390 can also be used as an electronic book and in that case the virtual keyboard may be switched off. A disk drive 410 might also be provided to allow information to be uploaded and downloaded.

Figure 14D:
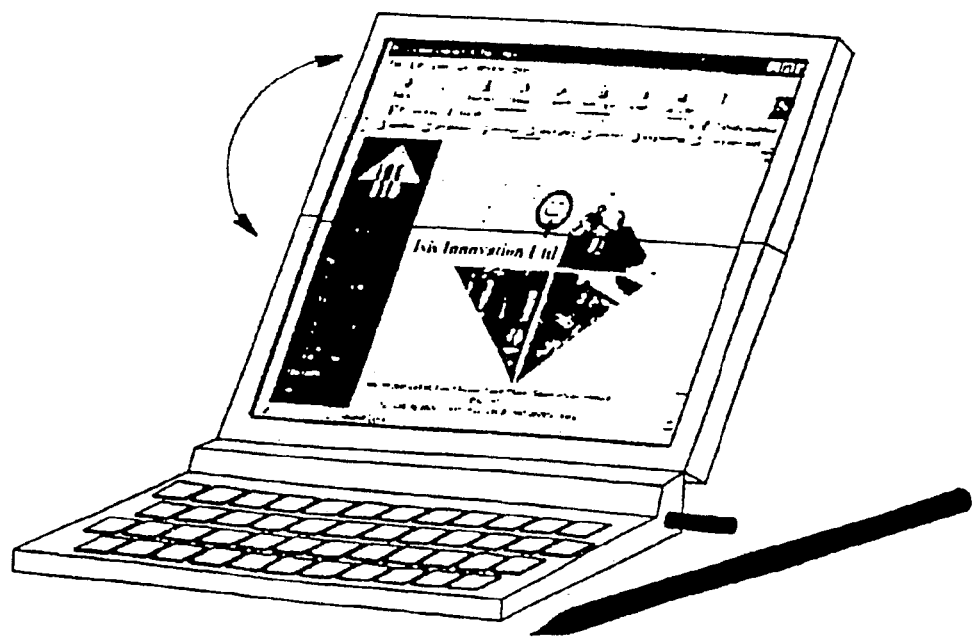

Finally, FIG. 14d shows a typical laptop computer similar to the Psion® Organiser™. Again, the screen is in two parts and is foldable as with the mobile phone of FIG. 14a.

Although the foregoing description has focussed upon smaller scale screens, and in particular liquid crystal displays, it is to be understood that the invention is not so limited. For example, bistable or electroluminescent displays are equally susceptible to the use of a material, coating or structural formation that will allow bending of light to minimize panel gaps between adjoining displays. Furthermore, the use of multiple television or video screens placed next to one another to form a giant display for large public areas such as shopping malls, is known. Typically, each video or television screen has a diagonal screen dimension of around 600 mm. Because of the additional hardware necessary around the screen, there is usually a significant gap between adjacent screens. This can again be minimised using lenses to form a pseudo-continuous display. In this case, image compression might be achieved electronically without moving pixels. Such an arrangement also illustrates that the number of smaller screens that can be used to make up the single, composite larger screen is essentially unlimited.

What is claimed is:

1. A visual display screen arrangement for displaying an image, comprising:

image display means having a display area;

a translucent cover member arranged to cover the display area and having a first cover member edge, the display area having an edge extending towards but not as far as the said first cover member edge;

characterised in that the cover member:
  (a) has a generally planar portion covering at least a part of the display area and being arranged to pass rays of light substantially without bending such that the majority of the display area as viewed externally of the arrangement and through the said generally planar portion, appears substantially undistorted;
  (b) has a refracting portion which includes the said first cover member edge, the said refracting portion being arranged to bend only those rays of light emanating from at or adjacent to the edge of the display area, such that the said display area as viewed externally of the arrangement and through the said refracting portion, appears to extend substantially as far as the edge of the cover member; and
  (c) is formed as a laminar construction: and (d) comprises a lower layer adjacent the display area and formed of a first material, an upper layer formed of a second, different material, and a polarisation/compensation layer sandwiched between the upper and lower layers.

2. The arrangement of claim 1, further comprising:

second image display means having a second display area;

a second cover member arranged to cover the second display area and having a second cover member edge located in use adjacent to the said first cover member edge, the second display area having an edge extending towards but not as far as the said second cover member edge, the second image display means being arranged to provide a second image within the second display area which is visible through at least a part of the said second cover member;

the second cover member having:
  (a) a second generally planar portion covering at least a part of the second display area and being arranged to pass rays of light substantially without bending such that the majority of the second display area, as viewed externally of the arrangement and through the said second generally planar portion, appears substantially undistorted; and
  (b) a second refracting portion which includes the said second cover member edge, the said second refracting portion being arranged to bend only those rays of light emanating from at or adjacent the edge of the second display area such that the said display area, as viewed externally of the arrangement and through the said second refracting portion, appears to extend substantially as far as the edge of the second cover member.

3. The arrangement of claim 2, further arranged to generate a part of an image both within the first display area and adjacent the first cover member edge, and also within the second display area and adjacent the second cover member edge.

4. The arrangement of claim 2, wherein the first image display means, and the first cover member together form a first screen member and wherein the first cover member edge provides a first joining edge, and the second image display means and the second cover member together form a second screen member, and wherein the second cover member edge provides a second joining edge, the first and second screen members being movable between a first position and a second position in which the first and second joining edges are adjacent, the first and second screen members are generally coplanar, and the first display area appears to a user substantially to abut the second display area at the confluence of the first and second joining edges.

5. The arrangement of claim 4, further comprising hinge means connecting the first and second screen members and constraining the first screen member and second screen member to be foldable between the said first and second positions.

6. The arrangement of claim 4, in which the first screen member and second screen member are each liquid crystal displays.

7. The arrangement of claim 1, in which the generally planar portion of the or each cover member is substantially coplanar with the refracting portion thereof, relative to the display area.

8. The arrangement of claim 1, further arranged to display the said image such that it is compressed but only in a region adjacent the or each cover member edge.

9. The arrangement of claim 8, in which the or each display area has a resolution adjacent to the respective cover member edge which is higher than the resolution of the or each display area away from the respective cover member edge so as to cause the said image compression adjacent the said cover member edge.

10. The arrangement of claim 8, in which the generally planar portion of the or each cover member is coterminous with that part of the display area which is arranged to display an uncompressed part of the image, and wherein the or each refracting portion is coterminous with that part of the display area adjacent to the respective cover member edge which is arranged to display the compressed part of the image.

11. The arrangement of claim 1, in which the refracting portion of the or each cover member edge is shaped so as to form a lens to bend light passing therethrough.

12. The arrangement of claim 11, in which the refracting portion of the or each cover member is formed into a convex radius at the corresponding cover member edge so as to form the or each said lens.

13. The arrangement of claim 11, in which the refracting portion of the or each cover member includes a region having a refractive index different to that of the material from which the rest of the cover member is formed.

14. The arrangement of claim 1, in which the lower layer is formed of glass and the upper layer is formed of a plastics material.

15. The arrangement of claim 14, in which the refracting portion of the or each cover member is formed from the upper, plastics layer thereof.

16. The arrangement of claim 1, in which the refractive portion of the or each cover member edge includes a reflective or refractive coating.

17. A mobile telephone including the visual display screen arrangement of claim 1.

18. A digital computer including the visual display screen arrangement of claim 1.

* * * * *